United States Patent Office 3,843,487
Patented Oct. 22, 1974

3,843,487
CURE OF RUBBER WITH TRIHALOISOCYANURIC ACID
Don V. Perkins, South Bend, Ind., assignor to Uniroyal, Inc., New York, N.Y.
No Drawing. Filed Jan. 22, 1973, Ser. No. 325,907
Int. Cl. C08c 17/20, 17/28; C08d 13/20, 13/28
U.S. Cl. 156—334                6 Claims

ABSTRACT OF THE DISCLOSURE

Rubber, such as EPDM, NR, SBR, can be cured by the action of a trihaloisocyanuric acid (e.g., trichloro isocyanuric acid). Elevated temperature is not necessary. EPDM compositions containing this curative are useful as adhesives, sealants or caulks which cure at ambient temperature. Cured sheets of EPDM can be cemented together with the adhesive. A solution of trihaloisocyanuric acid applied to an EPDM sheet causes the sheet to cure. Translucent films or films with high light transmission qualities are obtainable.

---

This invention relates to the cure of rubber, using a trihaloisocyanuric acid as the curing agent.

W. Hoffmann, "Vulcanization and Vulcanizing Agents" (Palmerton Publishing Co., New York, N.Y., 1967), page 309, refers to vulcanization with chlorine-containing compounds, but not with trihaloisocyanuric acids.

In accordance with the invention, it has now been found that rubber can be cured with a trihaloisocyanuric acid. The cure can be effected under ambient conditions. The rubber compositions of the invention containing a trihaloisocyanuric acid are particularly useful in the form of cements or adhesives, or high-solids sealants or caulking compositions, which are self-curing at ordinary ambient temperatures. The adhesive composition of the invention can be used to adhere two elastomeric bodies together. One advantageous feature of the invention is that translucent vulcanizates, or vulcanizates having high light transmission qualities, are obtainable.

The rubber employed in the invention may be an olefinically unsaturated elastomer, whether highly unsaturated as in such typical conjugated diene homopolymers or copolymers as natural rubber (basically polyisoprene) or a rubber of low unsaturation, particularly ethylene-propylene-non-conjugated diene elastomer, hereinafter referred to as "EPDM." These unsaturated elastomers are commonly termed "vulcanizable rubbers," in recognition of the fact that they can be vulcanized with sulfur and other vulcanizing agents. EPDM, which is the preferred elastomer in this invention, may be described more generally as a copolymer of at least two different alpha-monoolefins with at least one copolymerizable polyene which serves to confer unsaturation on the copolymer. Ordinarily one of the alpha-monoolefins is ethylene, while the other is ordinarily propylene, although other pairs of alpha-monoolefins may be used. The polyene employed is frequently a diene, and although conjugated dienes can be used, best results are ordinarily obtained with non-conjugated dienes, whether an open-chain diolefin as in 1,4-hexadiene or a cyclic diene as in such bridged ring dienes as dicyclopentadiene and the alkylene or alkylidene norbornenes (e.g., methylene norbornene, ethylidene norbornene, etc.), as described for example in U.S. Pat. 3,562,228, Matthews et al., Feb. 9, 1971. More than one diene (e.g., dicyclopentadiene plus 5-ethylidene-2-norbornene) can be used. More than one EPDM may be used in the composition of the invention, if desired.

In practicing the invention, the rubber is compounded with a trihaloisocyanuric acid, which has the formula

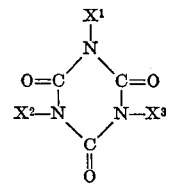

wherein $X^1$, $X^2$ and $X^3$ are the same or different halogen, usually chlorine or bromine, preferably chlorine, such as tribromoisocyanuric acid, trichloroisocyanuric acid, and the like.

The trihaloisocyanuric acid is employed in amount effective to cure or cross-link the elastomer in accordance with the invention. For this purpose the trihaloisocyanuric acid is frequently employed in amount of at least about 2 parts per 100 parts by weight of the rubber, particularly when the trihaloisocyanuric acid is mixed into the rubber composition, but smaller concentrations may also be effective, for example when the trihaloisocyanuric acid is introduced by diffusion (e.g., by application of a solution of the trihaloisocyanuric acid to the surface of a solid rubber body), as will be explained in more detail below. Larger amounts of trihaloisocyanuric acid (e.g., 10 parts or more per 100 of rubber) may be used, a preferred amount usually being about 4 to 8 parts.

The curable rubber composition of the invention may if desired be purely a gum stock, containing only the trihaloisocyanuric acid curative. Alternatively, the rubber composition of the invention may contain other compounding ingredients such as one or more fillers (e.g., carbon black, silica, zinc oxide, etc.). The amount of filler may vary widely, for example, from 0.5 to 150 parts per 100 parts by weight of the elastomer.

In one preferred practice of this invention the composition takes the form of a cement or adhesive comprising the described ingredients dissolved and/or dispersed in any suitable conventional inert volatile organic solvent or mixture of solvents. Extender oils or other plasticizing or softening substances may also be present. The proportion of solids in the cement is not critical and frequently ranges from 20 to 40%, by weight. The cement may be applied to bodies (e.g., elastomers, wood, textiles, etc.) to be adhered together by any suitable conventional method, such as brushing, spraying, roller coating, knife spreading, etc. In practice the trihaloisocyanuric acid is preferably withheld from the cement until just prior to use, and then added as a solution in a small amount of the solvent, usually cyclohexanone, to obtain better dispersion of the acid in the mixture. The cement may be painted, spread, or otherwise applied onto elastomeric bodies, such as sheets, molded objects, etc., prior to lamination. Upon curing of the cement the elastomeric bodies are found to be firmly adhered together. The elastomeric objects which are adhered with the aid of the cement of the invention may be either uncured or previously cured elastomer. The elastomer to be adhered by the cement may be EPDM as previously defined (an example of a suitable EPDM vulcanizate is disclosed in U.S. Pat. 3,330,790, Chambers, July 11, 1967, Example 1, Stock B cured 15 minutes at 320° F.), or other conventional rubber or elastomeric material, including the rubbery polymers of conjugated dienes, such as butadiene, isoprene, chlorobutadiene, etc., whether homopolymers as in polyisoprene (natural or synthetic), polybutadiene, polychloroprene and the like, or copolymers as in copolymers of such dienes with one or more copolymerizable monoethylenically unsaturated monomers (e.g., styrene, alpha-methylstyrene, acrylonitrile, methacrylonitrile, acrylic or methacrylic acids or esters thereof, isobutylene, vinylpyridine, etc.) as in butadiene-styrene copolymer, butadiene-acrylonitrile copolymer, isoprene-isobutylene copolymer, whether emulsion-prepared or solution-prepared, stereospecific or otherwise. As indicated, these elastomers may be adhered either in the cured (e.g., sulfur-cured, peroxide-cured, or otherwise cured) or uncured state, using the cement of the invention. Best results are usually obtained if the elastomeric surfaces to be adhered are first buffed or otherwise roughened, prior to application of the cement, particularly if the elastomer has previously been cured. Sheets of cured EPDM coated with the cement and lapped to form a seam become strongly adhered together upon cure of the cement, especially cement based on EPDM. In this manner weather-resistant, waterproof covering may be produced on roofs and the like.

The cements or solutions may also be used as coatings or for making dipped goods or cast films, sheets, or the like. Films cast from such cements onto a suitable release surface form cured vulcanizates in 1 to 6 hours at ambient temperatures (e.g., 72° F.). In general, this form of the invention usually involves applying the cement to a suitable forming surface, evaporating the solvent, subjecting to ambient temperature to cure the elastomer and removing the formed body from the forming surface.

In another preferred embodiment of the invention the composition may take the form of a sealant or caulking composition, usually having a plastic or pasty consistency at room temperature. For this purpose various conventional softening and/or plasticizing substances may be incorporated in the composition. Thus, caulks, sealants and sealers may be prepared by kneading an elastomer with filler, oils, solvents until a knife-spreadable gum is produced, after which the trihaloisocyanuric acid curative is introduced and the caulk is ready for immediate use. The caulk or sealant is introduced into a space or cavity to be caulked or sealed, whereupon curing for 2 to 4 days at ambient conditions produces tough vulcanizates. This form of the invention is particularly useful for such sealant or caulking applications as weatherproofing of buildings, windows, etc., expansion joints for pavements, filling seams of boats, etc.

An advantageous way of practicing the invention involves introducing the trihaloisocyanuric acid curative to the elastomer by diffusion. According to this method of making a cured body, the elastomer is shaped in a desired shape, and the trihaloisocyanuric acid, suitably in the form of a solution in cyclohexanone, is applied to the surface of the elastomer. The curative diffuses into the elastomer and cure takes place.

The curing method of the invention operates, as indicated, at ordinary ambient or room temperature. Outdoors in cold weather (e.g., −10° F.) the system is operative although a longer period of time will of course be required to reach the same level of cure as is obtained indoors or in warm weather. "Ambient temperature" as used herein includes such moderately elevated surface temperatures as may sometimes be encountered in working in sunlight for example (e.g., 110° F. or more). In general, the lower the concentration of curatives in the composition the longer the cure cycle required to achieve a given level of cure at a particular ambient temperature. At lower ambient temperatures higher levels of curatives may be desirable whereas at more elevated ambient temperatures lower concentrations of curatives may be used to achieve a satisfactory state of cure within a desired time. Although ordinarily not necessary, conventional elevated curing temperatures may also be applied, for example when a very low concentration of curative is employed or when the rubber employed is one which reacts only slowly (e.g., butyl rubber, NBR).

The reaction between natural rubber and trichloroisocyanuric acid as the sole curing agent at room temperature may be demonstrated by adding 5 pphr, (parts per hundred parts by weight of rubber) of trichloroisocyanuric acid (dissolved in a small amount of cyclohexanone) to a stirred 5% solution of washed smoked sheet in hexane. A stringy mass of crosslinked rubber wraps itself immediately around the mixer blade. There is no measurable increase in viscosity of the remaining solution after 24 hours. Repetition of the procedure with a 5% solution of SBR 1500 gives a similar result. Such reactions are useful in the formation of rubber fibers (see U.S. Pat. 2,953,839, Kohrn et al., Sept. 27, 1960).

Using a 5% solution of nitrile rubber (Paracril C, trademark) in methyl ethyl ketone, addition of 2 pphr. of trichloroisocyanuric acid produces small soft lumps of crosslinked rubber immediately. The body of the solution remains clear with no detectable change in viscosity after 24 hours. 5% of butyl rubber 268 dissolved in hexane gives a similar result upon addition of 2 pphr. of trichloroisocyanuric acid.

Similarly, trichloroisocyanuric acid is capable of crosslinking with EPDM polymers containing any of the three main types of pendant diene groups, namely, 1,4-hexadiene, dicyclopentadiene and norbornenes, but the preferred dienes are the 1,4-hexadiene and dicyclopentadiene types.

The following examples, in which all quantities are expressed by weight unless otherwise indicated, will serve to illustrate the practice of the invention in more detail.

EXAMPLE 1

A 5% solution of EPDM is prepared. The EPDM contains 65% ethylene, 30% propylene, and 5% dicyclopentadiene, and has a Mooney viscosity of 60 ML-4-212° F. Six pphr. of trichlorisocyanuric acid (dissolved in a small amount of cyclohexanone) is stirred into the solution. Within about 2 minutes the viscosity of the solution has increased, from an initial value of about 97.5 cps. (centipoises, measured by a Brookfield viscometer, No. 1 spindle at 20 r.p.m.) to about 130 cps. After about 10 minutes the viscosity is about 248 cps.; at 30 minutes the viscosity has increased to about 475 cps.

A film is cast from the solution and allowed to age 14 days at room temperature, after which the tensile strength, elongation at break and hardness are measured, with the results noted in Table I, under "EPDM–1." Table I also shows, for comparison, the result obtained on a 14 day old film cast from the same EPDM solution containing no trichloroisocyanuric acid curative; this control film is too soft to test. Table I further shows the results obtained by substituting two other EPDM's for "EPDM–1," as follows: "EPDM–2" which contains 53% ethylene, 42% propylene, and 5% 5-ethylidene-2-norbornene, and has a Mooney viscosity of 55 ML-4-212° F.; "EPDM–3" which contains 48% ethylene, 47% propylene, and 5% 5-ethylidene-2-norbornene, and has a Mooney viscosity of 45 ML-4-212° F.

TABLE I

Physical properties on 5% solutions of EPDM polymers (no loading) containing trichloroisocyanuric acid as the sole vulcanization agent cast into films and allowed to age 14 days at room temperature

| Property | EPDM-1 | | EPDM-2 | | EPDM-3 | |
|---|---|---|---|---|---|---|
| | No acid | 6 pphr. acid | No acid | 6 pphr. acid | No acid | 5 pphr. acid |
| Tensile, p.s.i. | Too soft to test | 1,300 | Too soft to test | 1,126 | Too soft to test | 747 |
| Elongation, percent | do | 620 | do | 940 | do | 880 |
| Hardness, Shore A | do | 40 | do | 43 | do | 38 |

The cast films of the invention cured with trichlorocyanuric acid have a remarkable characteristic which is not attainable by any room temperature cure system to date, as far as the inventor is aware, namely, translucency or light transmitting qualities (as defined for example in U.S. Pat. 3,408,320, Brucksch, Oct. 29, 1968, wherein transparent EPDM composition cured at elevated temperature are disclosed). The curative imparts no color to the compound, in contrast to the discoloration experienced with other room temperature curing systems utilizing GMF to effect a cure. Thus, cured articles having a light color can be made, filled for example with such mineral fillers as silica (e.g., "Hi Sil 215" [trademark]), hydrated calcium silicate (e.g., "Silene D" [trademark]), zinc oxide, or the like, if desired.

EXAMPLE 2

Three masterbatches are prepared according to the following recipes:

| Masterbatch | A | B | C |
|---|---|---|---|
| EPDM-1 | 100 | | |
| EPDM-4 | | 100 | |
| EPDM-2 | | | 100 |
| Carbon black (HAF) | 50 | 50 | 50 |
| Oil | 15 | 15 | 15 |
| Zinc oxide | 5 | 5 | 5 |

The EPDM-1 and EPDM-2 are as previously identified. EPDM-4 contains 51% ethylene, 39% propylene, and 10% 5-ethylidene-2-norbornene and has a Mooney viscosity of 60 ML-4-212° F. The oil is a petroleum hydrocarbon extender or processing oil of mixed aromatic (10%) naphthenic (42%) and paraffinic (48%) type, API (American Petroleum Institute) gravity, 21.5. The masterbatches shown are mill mixed, then cut into cement form at 20% total solids in xylene. Six pphr. of trichloroisocyanuric acid dissolved in cyclohexanone is added to each cement, films are cast, and properties determined after 30 days aging at room temperature, and again after heat aging an additional 72 hours at 212° F., with the results shown in Table II.

EXAMPLE 4

A sample of Masterbatch A described in Example 2 is cast into a film containing no trichlorisocyanuric acid. After solvent evaporation, one-half of the surface of the film is painted with an 8% solution of trichlorisocyanuric acid in cyclohexanone. Thirty days after painting the surface, the Shore A hardness of the top surface of the film is 67 in the treated area and 55 in the non-treated area, indicating that a surface cure is obtained in the treated area, by diffusion of the trichloroisocyanuric acid curative into the stock.

Having thus described my invention, what I claim and desire to protect by Letters Patent is:

1. A method of adhering two bodies together comprising applying to a surface of at least one of said bodies an adhesive cement comprising an olefinically unsaturated vulcanizable elastomer which is a copolymer of at least two different alpha-monoolefins with at least one copolymerizable polyene in admixture with a trihaloisocyanuric acid in amount effective to cure the said elastomer dissolved in an inert volatile organic solvent, bringing said bodies together with said adhesive thereinbetween, and subjecting the assembly to curing temperature to cure the adhesive and thereby adhesively secure the bodies together.

2. A method of adhering two cured ethylene-propylene-non-conjugated diene terpolymer rubber bodies together comprising applying to a surface of at least one of said bodies an adhesive cement comprising an olefinically unsaturated vulcanizable elastomer which is an ethylene-propylene-non-conjugated diene terpolymer in admixture with a trihaloisocyanuric acid in amount effective to cure said elastomer dissolved in an inert volatile organic solvent, bringing said bodies together with said adhesive thereinbetween, and subjecting the assembly to ambient temperature to cure the adhesive and thereby adhesively secure the bodies together.

3. A method as in claim 2 in which the trihaloisocyanuric acid is trichloroisocyanuric acid.

4. A method as in claim 3 in which the diene in the said elastomer is dicyclopentadiene.

TABLE II
Physical property checks on 30 day room temperature aged films cast from 20% solutions of Masterbatches A, B and C plus physical properties on the aged films after 72 hrs. at 212° F.

| Property | Masterbatch A (EPDM-1) 20% solution in xylene plus 6 pphr. trichloroisocyanuric acid | | Masterbatch B (EPDM-4) 20% solution in xylene plus 2 pphr. trichloroisocyanuric acid | | Masterbatch C (EPDM-2) 20% solution in xylene plus 4 pphr. trichloroisocyanuric acid | |
|---|---|---|---|---|---|---|
| | 30 days at RT | 30 days at RT plus 72 hrs. at 212° F. | 30 days at RT | 30 days at RT plus 72 hrs. at 212° F. | 30 days at RT | 30 days at RT plus 72 hrs. at 212° F. |
| Tensile, p.s.i. | 1,512 | 1,249 | 55 | 700 | 75 | 2,333 |
| Elongation, percent | 180 | 105 | 300 | 180 | 420 | 310 |
| Shore A hardness | 67 | 71 | 55 | 67 | 58 | 68 |

EXAMPLE 3

A cement prepared as in Example 2 from Masterbatch A is painted onto the surfaces of conventional sulfur-cured sheets of EPDM. In one case the surfaces of the sheets are previously prepared by washing with solvent; in another case the surfaces additionally are buffed. The sheets are then overlapped one inch and the cement is allowed to cure at room temperature (about 73° F.) for 3 days or for 10 days, after which a shear adhesion test is performed, with the results shown in Table III.

TABLE III

| Substrate preparation | Shear adhesion 2"/min. pounds/in.² of adhesion area | |
|---|---|---|
| | 3-days after fabrication | 10 days after fabrication |
| Solvent washed | 37.1 | 47.0 |
| Buffed and solvent washed | 43.4 | 62.4 |

5. A method as in claim 3 in which the diene in the said elastomer is 1,4-hexadiene.

6. A method as in claim 3 in which the diene in the said elastomer is 5-ethylidene-2-norbornene.

References Cited

UNITED STATES PATENTS

| 3,730,951 | 5/1973 | Braude | 260—77.5 B |
| 3,403,138 | 9/1968 | Edwards | 260—88.2 |
| 3,379,707 | 4/1968 | Lund et al. | 260—94.9 |

OTHER REFERENCES

Hoffmann, W.: "Vulcanization and Vulcanizing Agents" (Palmerton, N.Y.) 1967, pp. 260-265.

Alliger, G. and Sjothun, I. J.: "Vulcanization of Elastomers" (Reinhold), 1964.

JOSEPH L. SCHOFER, Primary Examiner

A. L. CLINGMAN, Assistant Examiner

U.S. Cl. X.R.

260—80.78, 94.7 HA, 94.7 N, 94.9 GA, 94.9 GB